United States Patent [19]

Cheavin

[11] 4,072,969
[45] Feb. 7, 1978

[54] RANGING SYSTEM FOR CAMERA VIEWFINDER
[75] Inventor: Michael Cheavin, Enger, Germany
[73] Assignee: Balda-Werke Photographische Geräte und Kunststoff GmbH & Co. KG., Bunde, Germany
[21] Appl. No.: 742,517
[22] Filed: Nov. 16, 1976
[30] Foreign Application Priority Data
July 16, 1976 Germany .............................. 2632143
[51] Int. Cl.$^2$ ............................................. G03B 13/20
[52] U.S. Cl. ................................... 354/166; 354/219; 354/225
[58] Field of Search ............... 354/166, 163, 164, 221, 354/222, 224, 225, 219

[56] References Cited
U.S. PATENT DOCUMENTS

| | | | |
|---|---|---|---|
| 3,029,720 | 4/1962 | Leitz et al. | 354/166 |
| 3,667,366 | 6/1972 | Engelsmara et al. | 354/166 X |
| 3,719,422 | 3/1973 | Lard et al. | 354/166 X |

Primary Examiner—Edna M. O'Connor
Attorney, Agent, or Firm—Howard I. Schuldenfrei

[57] ABSTRACT

A ranging system for a camera is provided including a reflecting means and a marking means including movable masking means reflected thereby into the viewfinder of a camera. The reflecting means within the scope of this invention includes means for translating an axial movement of the movable masking means to the camera viewfinder as a positional movement transverse to the actual displacement direction thereof. To effect this image transfer, the marking means includes at least one mirror mounted adjacent to the masking means at an angle of about 45° to the displacement direction thereof. According to one embodiment of the invention, an annular mark is projected into the viewfinder. To project an image of this character, the marking means includes an interiorly mirrored conical member, and the masking means includes a mandrel axially mounted therein, the mandrel being displaceable along the conical axis. According to another embodiment of the invention, the marking means includes mirrored polyhedronal side walls and the masking means includes a polygonal member movable within the area of the mirrored side walls.

10 Claims, 10 Drawing Figures

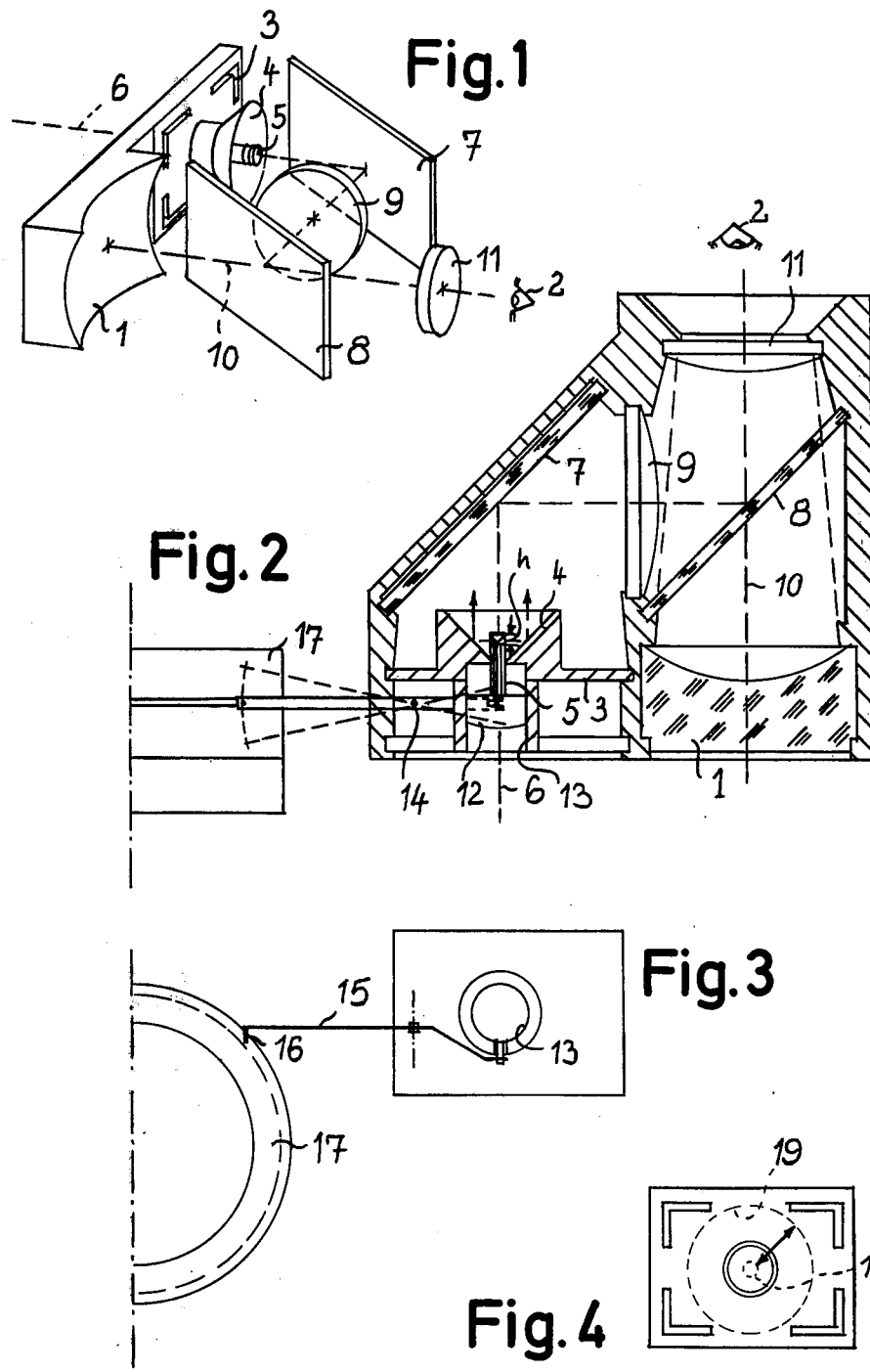

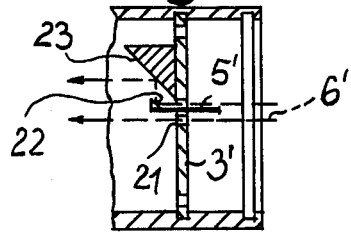
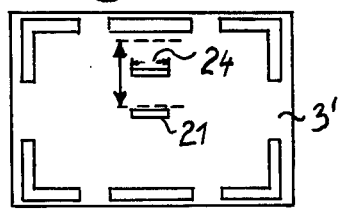
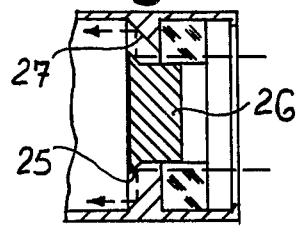
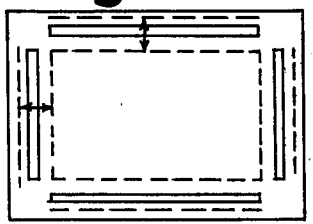
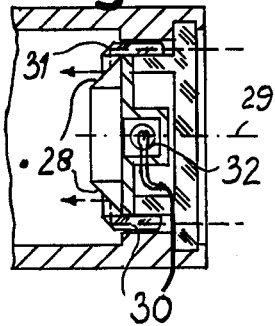
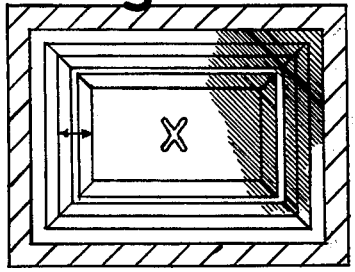

4,072,969

RANGING SYSTEM FOR CAMERA VIEWFINDER

BACKGROUND OF THE INVENTION

The present invention relates generally to cameras, and more particularly to an improved ranging system for sighting variably positioned objects through a camera viewfinder.

Prior to the development of mechanical ranging means, it was known to measure camera range intrinsically by reliance upon variable external markings. Portrait photographers, for instance, measured the distance between a subject's chin and forehead to determine the appropriate camera range. This method, of course is tedious and only particularly suited to fixed object photography.

Therefore, mechanical ranging means such as "variable sighting circles" have been developed to provide the photographer with an adjustable reference value for picture taking. The principle of operation of this type mechanical means includes a lens and mirror combination which reflects a marking, such as a circular mask or the like, into the camera viewfinder. In practice, the corresponding mirror image sighting circle projected into the camera viewfinder diametrically adjusts to the orientation of the reflected mark. To assure a sharp reflection of the mark in the viewfinder, an aspherical lens is mounted between the mark and reflecting mirror and projects a sharp image of the mark in all positions thereof.

In connection with this type device, the camera is focused by adjusting the marking member until, for instance, the sighting circle surrounds, for example, the head of the subject to be photographed. This focusing method is based upon the fact that adults and children have substantially the same head size, and the size differences thereof have no significant effect upon the sharpness of focus of the camera.

The principal disadvantage of this type device is the requirement of the aspherical lens mounted between the mask and mirror for sharp image formation in the camera viewfinder. The need for the aspherical lens severely escalates the cost of the system.

Other types of devices whose principles of operation rely upon adjusting to objects of previously known size are similarly very expensive.

Accordingly, the instant invention provides a ranging system of the type generally heretofore described which overcomes the disadvantages of the prior devices, which is uniquely but simply constructed and economically practical.

SUMMARY OF THE INVENTION

Generally speaking, in accordance with the invention, a ranging system for a camera is provided including a reflecting means and a marking means including movable masking means reflected thereby into the viewfinder of a camera. The reflecting means within the scope of this invention includes means for translating an axial movement of the movable masking means to the camera viewfinder as a positional movement transverse to the actual displacement direction thereof. To effect this image transfer, the marking means includes at least one mirror mounted adjacent to the masking means at an angle of about 45° to the displacement direction thereof. According to one embodiment of the invention, an annular mark is projected into the viewfinder. To project an image of this character, the marking means includes an interiorly mirrored conical surface, and the masking means includes a mandrel axially mounted therein, the mandrel being displaceable along the conical axis. According to another embodiment of the invention, the marking means includes mirrored polyhedronal side walls and the masking means includes a polygonal member movable within the area of the mirrored side walls.

Accordingly, it is an object of this invention to provide an improved ranging system for a camera.

Another object of the invention is to provide a novel marking means for a camera ranging system.

A further object of the invention is to provide novel means for transferring an axial positional movement of the marking member of a camera ranging system to the viewfinder thereof.

Still another object of the invention is to provide a relatively inexpensive but highly satisfactory ranging system for a camera.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an exploded view of an embodiment of a ranging system constructed according to the instant invention including a conical reflector for an optically biaxial viewfinder;

FIG. 2 is a horizontal section through a viewfinder having mounted therein the embodiment seen in FIG. 1, the viewfinder including movable marks and a lens transfer lever;

FIG. 3 is an enlarged front view of the transfer lever seen in FIG. 2;

FIG. 4 is a detailed view of the image translated into the viewfinder by the ranging system seen in FIG. 2;

FIG. 5 is a fragmentary vertical section of another embodiment of the invention which projects a fixed mark and a variably spaced movable mark into the viewfinder;

FIG. 6 is a view of the image projected into the camera viewfinder by the embodiment seen in FIG. 5;

FIG. 7 is a fragmentary view of still another embodiment of the invention having a luminous frame of variable dimensions;

FIG. 8 is a view of the image projected into a viewfinder by the embodiment seen in FIG. 7;

FIG. 9 is a fragmentary view of yet another embodiment of the invention which includes a luminous frame of variable size; and FIG. 10 is a view of the viewfinder image provided by the embodiment seen in FIG. 9.

DETAILED DESCRIPTION OF THE INVENTION

Referring now to the Drawings, the rangefinder system within the scope of the instant invention is suited for use with conventional photographic cameras, as well as compact instant picture type cameras having an objective lens, which may for instance be reciprocally mounted in the camera housing. Various types of focusing systems have been developed for these cameras. For instance, as previously mentioned, according to some systems the objective lens and lens housing may be reciprocal about a fixed point to bring an object into focus, while other systems may employ a fixed lens mounting and movable operative linkage cooperatively connected thereto for focusing.

Referring now to FIGS. 1-4, and particularly to FIG. 1 which is an exploded view of the elements of the system, an eyepiece 11 and a viewfinder lens 1 are optically aligned along a linear sight path 10 of the viewer's eye 2. According to the elemental principles of the invention, a marking member generally coplanar with the viewfinder lens 1, and in the assembly seen in FIG. 1 integrally adjacent thereto, is provided with a mask generally numbered 3 on the inner surface thereof including luminous framing means which are optically transposed onto the inner surface of the viewfinder lens 1, as the viewer's eye 2 peers through eyepiece 11 along sight path 10 into the viewfinder lens 1. Transference of the image onto the surface of the viewfinder lens 1 is effected by an optical assembly including a mirror 7, a positive lens 9 and a dichroic mirror or beam-splitter 8. The particular image transferred is functionally related to the construction, display disposition and assembly of the masking means. The image transferred onto the inner surface of the viewfinder lens 1 by the mask embodiment set forth in FIGS. 1-3 is seen in FIG. 4, and is generally of retractile annular character.

The masking surface of the marking member includes luminous discrete right angle segments, each of the right angle segments defining the corner of a frame. Mounted on the masking surface centrally within the frame is an outwardly opening conical shell 4 having a mirrored interior surface. Concentrically mounted in the conical shell 4 is an axially displaceable mandrel 5. The axis of displacement of mandrel 5 is shown along line 6.

Mask 3, including the interiorly mirrored surface of conical shell 4 and mandrel 5, is reflectively aligned with mirror 7 and the image projected thereby into mirror 7, image projection being effected by the luminous nature thereof, is reflected through positive lens 9 into beam-splitter 8. As viewed through eyepiece 11, the image projected by luminous mask 3 appears visually to overlay viewfinder lens 1.

For illustrative purposes, the conical member 4 has been physically shown as a structural element in FIG. 1. However, in practice, as best seen in FIG. 2, the conical member 4 is a mirrored conical recess formed in the marking member.

Referring now to FIG. 2, the system generally seen in FIG. 1 is discretely housed in a casing member and the cooperative relationship among elements thereof is shown in detail. At one end of an optical channel formed in the casing member is the eyepiece 11 and optically aligned therewith at the other end of the channel is the viewfinder lens 1. Angularly mounted across the optical channel between eyepiece 11 and viewfinder lens 1 is the dichroic mirror or beam-splitter 8. Interiorly mounted along a side wall of the casing member in parallel to the beam-splitter 8 is the reflective mirror 7. Mounted longitudinally in the casing between the beam-splitter 8 and the reflective mirror 7 is the positive lens 9. Mounted in the base of the casing adjacent viewfinder lens 1 and facing upwardly toward reflective mirror 7 is the masking means 3.

In the assembled embodiment seen in FIG. 2, as heretofore described, the conical surface 4 is formed integrally in the marking means and the mandrel 5 is axially movably mounted therein. Underlying the mirrored conical surface 4 is a channel 13 in which a converging lens 12 is movably housed. An end of mandrel 5 extends into the channel 13 and is connected to the converging lens. The mandrel 5 and the converging lens 12 are, therefore, correspondingly reciprocally longitudinally movable.

A transmission lever 15 having a fulcrum pivot point 14 is mounted in the casing and has an end extending into the channel 13 which may be connected to either mandrel 5 or converging lens 12. The opposite end of the transmission lever 15 extends beyond the casing and is operatively connected to the objective lens housing 17, as best seen in FIG. 3. The perimeter of the lens housing is provided with an annular groove in which a pin 16 mounted on the end of the lever 15 cams. As the lens housing 17 is rotated to focus the lens, the end of transmission lever 15 operatively connected thereto is reversely movable, as best seen in FIG. 2. The movement of transmission lever 15 is correspondingly transmitted to the converging lens 12 and the mandrel 5.

Centrally mounted on the top end of the mandrel 5 is an inwardly tapered cone having height h which is uniformly inclined at an angle of 45 degrees to the axis 6 thereof. The surface of the cone is coated with a reflective material. According to this embodiment, the angle of divergency of the reflectively surfaced cone and the mirrored conical surface 4 correspond, both being 45 degrees relative to the displacement axis 6 of mandrel 5. As best seen in FIG. 2, an annular collar surrounds the cone provided in mandrel 5.

The mirrored conical recess 4 and mandrel 5 project an annular image onto the reflective mirror 7 which transfers the image through the positive lens 9 onto the beam-splitter 8, and the image is visually apparent in the viewfinder. As the mandrel 5 is moved by rotating the lens housing 17, the ring appearing in the viewfinder enlarges or contracts. At an infinity setting the ring contracts to a spot 18, shown in FIG. 4. Alternatively, the mask may be thus arranged so the ring becomes invisible at the infinity setting. At the closest photographing distance, however, the ring has a diameter 19, as seen in FIG. 4.

Referring now to FIG. 5 which illustrates another embodiment of the invention, the marking means includes a luminous mask 3' and is provided with a central fixed marking slot 21. A mandrel 5' movably mounted in the marking means has a reflective surface 22 inclined 45° relative to its displacement axis 6'. The surface 22 lies parallel to a fixed mirrored surface 23 also inclined 45° to the axis 6'. The width of the reflective surface 22 is such that a mark having a width 24 appears in the viewfinder, as seen in FIG. 6. Depending upon the direction and extent of movement of mandrel 5, for instance to the left or right as seen in FIG. 5, the distance between the image 21 of the fixed mark and the movable image 24 varies as seen through the viewfinder lens.

The embodiment seen in FIGS. 5 and 6 represents an alternative marking means which may be substituted in the assembly seen in FIGS. 1 and 2, which has heretofore been discussed in detail, and the manner of operation thereof is the same as heretofore described. For example, the relative juxtapositions of the marking means seen in FIGS. 2 and 5 are the same, the mandrel 5' is cooperatively connected to the converging lens 12, and the mandrel 5' is movable by the transmission lever 15, which is actuated by the focusing movement of the lens housing 17. FIGS. 7 and 9 are illustrative of still other embodiments of marking means that may be substituted in the assembly seen in FIGS. 1 and 2, and the manner of operation thereof is the same as heretofore described in detail, while the image projected thereby differ as respectively seen in FIGS. 8 and 10.

Referring now to FIGS. 7 and 8, a reflective surface 25 is circumferentially mounted along the underside surface of a radially extended lip of a linearly displaceable rectangular member 26, the rectangular member being linearly displaceable relative to the stationary marking means base in which it is movably mounted. The marking means is provided with an inclined lip corresponding to the declining radially extended lip formed in the rectangular member 26, the inclined lip being provided with a mirrored surface 27. The reflective surface 25 and the fixed mirrored surface 27 are in substantial parallel relationship, and respectively inclined at an angle of 45° to the axis of displacement of rectnagular member 26. The reflective surface 25 and the mirrored surface 27 cooperate to produce the image seen in FIG. 8. The reflective surface 25 comprises discrete reflective segments provided along the edges of the lip formed in the rectangular member 26. Displacement of the rectangular member 26 by the transmission lever, for instance to the left or right, results concomitantly in the production of a larger or smaller frame superposed on the viewfinder, as seen in FIG. 8.

Referring now to FIGS. 9 and 10, centrally mounted on the marking means is a rectangular member surrounded by a circumferential inclined fixed mirrored surface 28. Surrounding the mirrored surface 28 is a slidably mounted substantially rectangular frame 30 which is movable, as hereinbefore described, in the direction of longitudinal axis 29. Mounted along the front edge of the frame 30 is an inclined reflective surface 31 which corresponds to the mirrored surface 28. The reflective surface 31 and the mirrored surface 28 are in substantial parallel relationship, and each of the surfaces is arranged substantially at an angle of 45° to the longitudinal axis 29.

Mounted in the marking means underlying the rectangular member is a control or warning lamp 32. Displacement of the frame 30 to the left or right, as seen in FIG. 9, causes the luminous image of the frame to increase or decrease in the viewfinder. It is a particular advantage of this embodiment that a closed luminous frame always appears in the viewfinder regardless of the size thereof.

While a control or warning lamp is shown only in the embodiment of FIGS. 9 and 10, the embodiments seen in FIGS. 2, 5 and 7 may be adapted to include such a lamp. Such lamps are well known in the art and are used for projecting symbols in connection with other camera functions such as exposure timing or aperture setting.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved ranging system for an encased camera of the type having an objective lens mounted in said camera casing, and focusing means therefor, said ranging system being of the type including an optically aligned eyepiece and viewfinder lens defining a field of view for an operator looking through said system, said field of view including the scene to be photographed, said improving ranging system comprising, in combination, a luminous marking means lying substantially in the plane of said viewfinder lens, said marking means including a movably mounted masking means, said masking means being axially movable substantially at an angle normal to said plane of said marking means, said movable masking means including a reflective surface which is angularly oriented at about 45° to said axis of movement thereof, said marking means including a mirrored surface corresponding to said reflective surface which is similarly angularly oriented; means for axially moving said masking means, said moving means being operatively connected to said focusing means for axially displacing said masking means in correspondence to a focusing movement; and means for superposing an image of said marking means in the line of sight between said eyepiece and said viewfinder lens, said means translating an axial movement of said masking means into a laterally displaced image transfer in the line of sight between said eyepiece and said viewfinder lens.

2. The improved ranging system as claimed in claim 1, said means for superposing an image of said marking means in the line of sight between said eyepiece and said viewfinder lens comprising a dichroic mirror intersecting said optical axis between said eyepiece and said viewfinder lens, said dichroic mirror extending in a plane oblique to respective planes of said eyepiece and said viewfinder lens; a fully reflective mirror mounted in spaced parallel relationship to said dichroic mirror; and a positive lens mounted between said dichroic mirror and said mirror in spaced parallel relationship to said optical axis between said eyepiece and said viewfinder lens.

3. The improved ranging system as claimed in claim 2, said marking means being mounted in specific angular relationship to said fully reflective mirror.

4. The improved ranging system as claimed in claim 3, said marking means including a mirrored conically tapered surface; and said masking means comprising a mandrel axially movably mounted in said mirrored conical surface, said mandrel having a top end including an inclined reflective surface, said mirrored conical surface and said inclined reflective surface being, respectively, at an angle of about 45° to the axis of movement of said mandrel.

5. The improved ranging system as claimed in claim 3, said marking means including a slot of predetermined fixed character and an inclined mirrored surface in specific spaced relationship thereto; said masking means comprising a mandrel axially movably mounted in said marking means between said slot and inclined mirrored surface, said mandrel having a top end including a declining reflective surface corresponding to said inclined mirrored surface, said corresponding surfaces being respectively at an angle of about 45° to said axis of movement of said mandrel.

6. The improved ranging system as claimed in claim 3, said masking means comprising a substantially rectangular member axially movably mounted in said marking means, said rectangular member having a radially extended peripheral lip, said lip having a declining reflective surface; said marking means including discrete mirrored inclined surfaces corresponding to said declining reflective surface, said corresponding surfaces being respectively at an angle of about 45° to said axis of movement of said rectangular member.

7. The improved ranging system as claimed in claim 3, said marking means including a member of trapezoidal cross-section mounted thereon, said member having inclined mirrored side walls; and said masking means comprising a movably mounted frame surrounding said member, said frame having a reflective tapered top edge corresponding to said inclined mirrored side walls of said member, said mirrored side walls being respectively inclined at an angle of about 45° to said axis of movement of said frame.

8. The improved ranging system as claimed in claim 7, including a warning lamp mounted in said marking means, said warning lamp underlying said member.

9. The improved ranging system as claimed in claim 1, said means for axially moving said masking means comprising a transmission lever having an end fixedly connected to said masking means.

10. The improved ranging system as claimed in claim 1, including a converging lens connected to said movable masking means.

* * * * *